(12) United States Patent
Morales et al.

(10) Patent No.: US 7,831,498 B2
(45) Date of Patent: Nov. 9, 2010

(54) SYSTEMS AND METHODS FOR PRODUCING SUSPICIOUS ACTIVITY REPORTS IN FINANCIAL TRANSACTIONS

(75) Inventors: John M. Morales, Aurora, CO (US);
James E. Cowell, Littleton, CO (US);
Melanie B. Mulleneaux, Parker, CO (US)

(73) Assignee: The Western Union Company, Englewood, CO (US)

( * ) Notice: Subject to any disclaimer, the term of this patent is extended or adjusted under 35 U.S.C. 154(b) by 1890 days.

(21) Appl. No.: 10/658,844

(22) Filed: Sep. 8, 2003

(65) Prior Publication Data

US 2004/0215558 A1 Oct. 28, 2004

Related U.S. Application Data

(60) Provisional application No. 60/465,967, filed on Apr. 25, 2003.

(51) Int. Cl.
*G06Q 40/00* (2006.01)
(52) U.S. Cl. .......................... 705/37; 705/38; 705/36; 705/35
(58) Field of Classification Search .......... 705/37, 705/36, 34; 709/224; 713/201; 790/35–38
See application file for complete search history.

(56) References Cited

U.S. PATENT DOCUMENTS

| 6,012,048 | A | 1/2000 | Gustin et al. |
| 6,015,087 | A | 1/2000 | Seifert et al. |
| 6,021,397 | A * | 2/2000 | Jones et al. ............... 705/36 R |
| 6,149,055 | A | 11/2000 | Gatto |
| 6,341,287 | B1 * | 1/2002 | Sziklai et al. ............... 707/102 |
| 6,484,203 | B1 * | 11/2002 | Porras et al. ............... 709/224 |
| 2001/0042785 | A1 * | 11/2001 | Walker et al. ............... 235/379 |
| 2004/0006532 | A1 * | 1/2004 | Lawrence et al. ............. 705/38 |
| 2004/0024693 | A1 * | 2/2004 | Lawrence ............. 705/38 |
| 2004/0117302 | A1 * | 6/2004 | Weichert et al. ............. 705/40 |

OTHER PUBLICATIONS

Partiers are told to be alert in celebrations; [Metro Edition] Amy Dorsett. San Antonio Express-News. San Antonio, Tex.: Apr. 18, 2003. p. 23.A.*

* cited by examiner

*Primary Examiner*—Hani M. Kazimi
*Assistant Examiner*—Clement Graham
(74) *Attorney, Agent, or Firm*—Townsend and Townsend and Crew LLP

(57) ABSTRACT

A method of producing a suspicious activity reports includes storing configuration information at a transaction processing device. The configuration information configures the device to produce suspicious activity reports based on certain criteria. The method also includes receiving transaction information and determining, based on the transaction information and the certain criteria, whether a suspicious activity report is to be prepared. The method also includes generating a suspicious activity report containing at least some of the transaction information.

15 Claims, 3 Drawing Sheets

TITLE TBD

Transaction Date: 02/13/03    Time: 12:20 PM   ⎫
Agent: 709980    Location: 123456   ⎬ 302
    ⎭

First Name:_____Middle:_____ ⎫
  ⎪
Last Name:_____ ⎪
  ⎪
Address:_____ ⎬ 304
  ⎪
City:_____State:_____ZIP:_____ ⎪
  ⎪
Country:_____ ⎭

ID Type: Driver's License    ID Number: 1234567980 ⎫
State: CO    Country: USA ⎬ 306
SSN: 123-45-3214    ⎭

Comments:
_____ ⎫
_____ ⎪
_____ ⎬ 308
_____ ⎭

SYSTEMS AND METHODS FOR PRODUCING SUSPICIOUS ACTIVITY REPORTS IN FINANCIAL TRANSACTIONS

CROSS-REFERENCES TO RELATED APPLICATIONS

This application is a non-provisional of and claims the benefit of Provisional U.S. Patent Application No. 60/465,967, entitled "SYSTEMS AND METHODS FOR PRODUCING SUSPICIOUS ACTIVITY REPORTS IN FINANCIAL TRANSACTIONS," filed on Apr. 25, 2003, the entire disclosure of which is herein incorporated by reference.

This application is related to co-pending, commonly assigned U.S. patent application Ser. No. 10/424,558, entitled "SYSTEMS AND METHODS FOR VERIFYING IDENTITIES IN TRANSACTIONS," filed on Apr. 25, 2003, and to co-pending, commonly assigned U.S. patent application Ser. No. 10/424,562, entitled "SYSTEMS AND METHODS FOR VALIDATING IDENTIFICATIONS IN FINANCIAL TRANSACTIONS Apr. 25, 2003 the entire disclosures of which are incorporated herein by reference for all purposes.

BACKGROUND OF THE INVENTION

The present invention relates generally to financial transactions. More specifically, the present invention relates to producing suspicious activity reports in connection with financial transactions.

In light of present world circumstances, it has become necessary to more closely scrutinize financial transactions that may be connected with terrorism, fraud, or other suspicious activities. In some cases, laws and regulations mandate that financial transaction processors assist in this effort by alerting authorities of suspicious activities. For these and other reasons, there is a need for systems and methods that enable or assist those involved in financial transactions with various reporting capabilities.

SUMMARY OF THE INVENTION

Embodiment of the invention thus provide a method of producing a suspicious activity reports. The method includes storing configuration information at a transaction processing device. The configuration information configures the device to produce suspicious activity reports based on certain criteria. The method also includes receiving transaction information and determining, based on the transaction information and the certain criteria, whether a suspicious activity report is to be prepared. The method also includes generating a suspicious activity report containing at least some of the transaction information.

In some embodiments, the method also includes transmitting the suspicious activity report to authorities. Transmitting the suspicious activity report to authorities may include collecting suspicious activity reports at a host computer system and transmitting the collected suspicious activity reports to a computer system of the authorities. The method also may include receiving additional information and including the additional information in the suspicious activity report. Generating a suspicious activity report may include printing a suspicious activity report having a portion of the additional information and also having blanks for receiving additional suspicious activity report information. The certain criteria may include a mandatory SAR threshold. Determining whether a suspicious activity report is to be prepared may include comparing an amount of a transaction to the mandatory SAR threshold. The certain criteria may include a SAR prompt threshold. Determining whether a suspicious activity report is to be prepared may include comparing an amount of a transaction to the SAR prompt threshold. Determining whether a suspicious activity report is to be prepared may include displaying a prompt that asks an operator if he wants to prepare a suspicious activity report and receiving a response to the prompt. Determining whether a suspicious activity report is to be prepared also may include determining whether an operator has elected to produce an on-demand SAR. The method may include printing a report relating to suspicious activity reports produced at the transaction processing device during a period of time. The transaction processing device may be configured to print money orders.

In other embodiments, the present invention provides a transaction processing device that includes an input device arranged to receive transaction information and SAR information, a display screen arranged to display information to an operator, and application software that programs the transaction device to store configuration information. The configuration information configures the device to produce suspicious activity reports based on certain criteria. The application software also programs the transaction device to receive transaction information, determine based on the transaction information and the certain criteria, whether a suspicious activity report is to be prepared, and generate a suspicious activity report containing at least some of the transaction information. In some embodiments, the certain criteria includes a mandatory SAR threshold. The application software also may program the transaction device to compare an amount of a transaction to the mandatory SAR threshold. The certain criteria may include a SAR prompt threshold. The application software also may program the transaction device to compare an amount of a transaction to the SAR prompt threshold. The application software also may program the transaction device to display a prompt that asks an operator if he wants to prepare a suspicious activity report and receive a response to the prompt. The application software also may program the transaction device to determine whether an operator has elected to produce an on-demand SAR. The application software further programs the transaction device to print a report relating to SARs produced at the transaction processing device during a period of time. The transaction processing device may be configured to print money orders.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

FIG. 3 illustrates a suspicious activity report according to embodiments of the present invention.

DETAILED DESCRIPTION OF THE INVENTION

Figure 1:
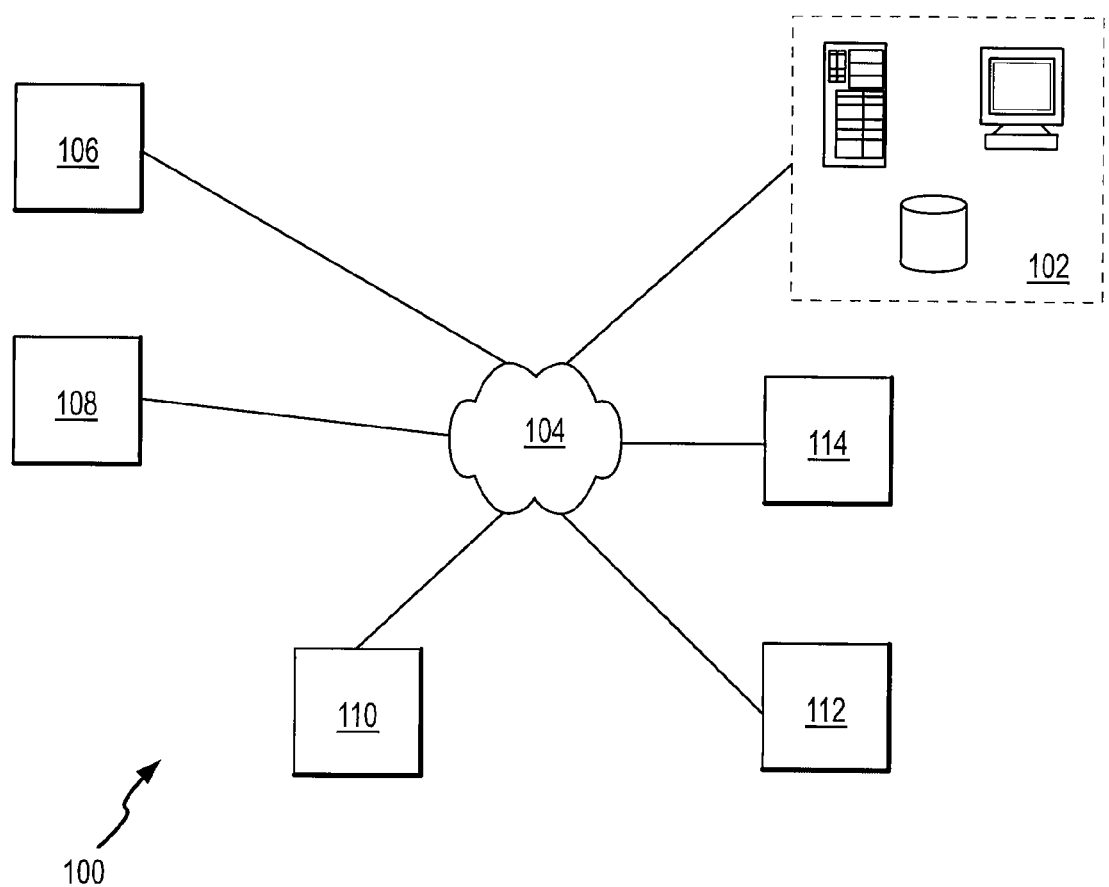
FIG. 1 illustrates a system for producing suspicious activity reports relating to financial transactions according to embodiments of the present invention.

According to the present invention, financial transaction processors employ systems and methods to produce suspicious activity reports (SARs) relating to transactions they process. Herein, "processor" will refer to a financial transaction processor. For example, "processor" may refer to an entity such as Western Union of Englewood, Colo., whose money transfer service is well known. Additionally, "associate" will refer to entities that a processors may enlist to accomplish the service. For example, third parties, such as merchants, financial institutions, and the like may be "associates." Further, although the phrase "financial transaction" will be used herein to refer to the type of service provided, that phrase will be understood to mean any transaction involving "value," which may include money, credits, customer loyalty points, other units of measure, and the like. Transactions may include the purchase or redemption of money orders, travelers checks, and the like, "wire transfers" of money or other value, cash advances, the loading of money or value on to smart cards or stored value cards, and the like.

Process for performing such transactions are well known. Briefly, a sender presents himself to a processor or associate and provides value, usually cash, to an operator. Transaction information is entered into a transaction processing device. In some cases, such as wire transfers and money order purchases, the process results in a record being produced that is transmitted to a host computer system. The record may include the amount of the transaction, a transaction number or serial number, and the like. In the case of a wire transfer to a recipient, the recipient would present himself to a receive site or of a processor or associate to obtain the money or other value. An operator at the receive site would then verify the identity of the receiver and gives the receiver the value. In other cases, such as travelers check purchases, the transaction processing device prints the instrument, and it is not necessary for information to be sent to a host computer system.

In connection with such transactions, it may be of interest to produce a report indicating that the transaction may involve suspicious activity. SARs may assist security and law enforcement authorities to prevent terrorist activity, money laundering, fraud, and the like, or otherwise find those responsible for such activities. According to the present invention, a transaction processing device collects relevant information for a SAR and assists the processor or associate in making that information available to authorities. In some cases, SARs are produced automatically for certain transactions. In other cases, the transaction processing device may prompt a user to produce a SAR and allow the operator to decline to do so. In still other examples, a SAR may be produced on demand if an operator elects to do so.

Once the information for a SAR is collected, it may be transmitted to authorities. This may be accomplished electronically and/or using printed SARs. Other examples are possible. The transaction processing device also may produce reports of SAR-related activity.

Having described the present invention generally, attention is directed to FIG. 1, which illustrates a financial transaction system 100 according to embodiments of the present invention. The system 100 includes a host computer system 102 and a network 104. The host computer system 102 may include, for example, server computers, personal computers, workstations, web servers, and/or other suitable computing devices. The host computer system 102 includes application software that programs the host computer system 102 to perform financial transactions. For example, application software resident on the host computer system 102 may program the host computer system 102 to process wire transfers. The host computer system 102 may include one or more of the aforementioned computing devices, as well as storage devices such as databases, disk drives, optical drives, and the like. The storage devices may include solid state memory, such as RAM, ROM, PROM, and the like, magnetic memory, such as disc drives, tape storage, and the like, and/or optical memory, such as DVD. The host computer system 102 may be filly located within a single facility or distributed geographically, in which case a network may be used to integrate the host computer system 102. Many other examples are possible and apparent to those skilled in the art in light of this disclosure.

The network 104 may be the Internet, an intranet, a wide area network (WAN), a local area network (LAN), a virtual private network, any combination of the foregoing, or the like. The network 104 may include both wired and wireless connections, including optical links. In some embodiments, the network 104 is a transaction processing network. Through the network 104, transaction devices communicate with the host computer system 102.

The system 100 may include one or more Point-of-Sale (POS) devices 106. POS devices are more fully described in U.S. Pat. No. 6,015,087, which is incorporated herein by reference in its entirety for all purposes. Essentially, POS devices are terminals for receiving transaction information and sending the information to a host computer system. POS devices are typically located at associate or processor locations offering money transfer services. POS devices may include an integral printer or may be connected to one. Thus, POS devices may be equipped to print money orders or receipts relating to wire transfers, for example. According to the present invention, the printers associated with POS devices, whether integral to the device or connected to it, may be used to print hard copies of SARs. These reports may include blanks for an operator to complete by hand. However, in some embodiments, especially those involving POS devices having alphanumeric keyboards, a printer may print a SAR with complete information, since the operator may enter all information electronically.

The system 100 also may include one or more computing devices 108 programmed to receive money transfer information from customers. Like the POS devices 106, the computing devices 108 may be located at associate locations. The computing devices may be equipped to print complete, partially complete or blank SARs.

The system also may include one or more customer service representative (CSR) computers 110. The CSR computers 110 may be located, for example, at a call center operated by the processor or an associate. The CSR computers 110 function much like the POS devices 106 and the computing devices 108, except that transaction information is entered by a CSR who is receiving the information from a customer by phone, for example.

The system 100 also includes one or more receiving sites 112 from which customers may receive funds. The receive sites 112 may be associate locations equipped with a POS 106 or computing device 108. The receive sites also may be automated teller machines, kiosks (which are more fully described in co-pending, commonly assigned U.S. patent application Ser. No. 10/225,410 filed on Aug. 20, 2002, the entire disclosure of which is incorporated herein for all purposes), merchant store fronts, bank accounts, or the like.

The system 100 also includes a computing system 114 operated by authorities. The computing system 114 may be any of the aforementioned computing devices. If SARs are sent electronically, as will be described below, then they may be sent from either a transaction processing device or host computer system 102, through the network 104, to the computing system 114.

According to the present invention, a customer presents himself to a financial transaction location. The location may be equipped with either a POS device 106, a computing device 108, or other suitable transaction processing device. The location may be operated by the processor or an associate. An attendant/transaction device operator (hereinafter operator) receives transaction information from the customer. The operator also enters the information into the transaction device. In the process, the operator may produce a SAR relating to the customer and the transaction. The SAR may be either electronic or hard copy, as will be described. A SAR also may be produced by an operator at a receiving sites 112, which may be configured for automatically producing SARs or prompting an operator to produce one. A receive site also may be configured to produce on-demand SARs.

Figure 2:
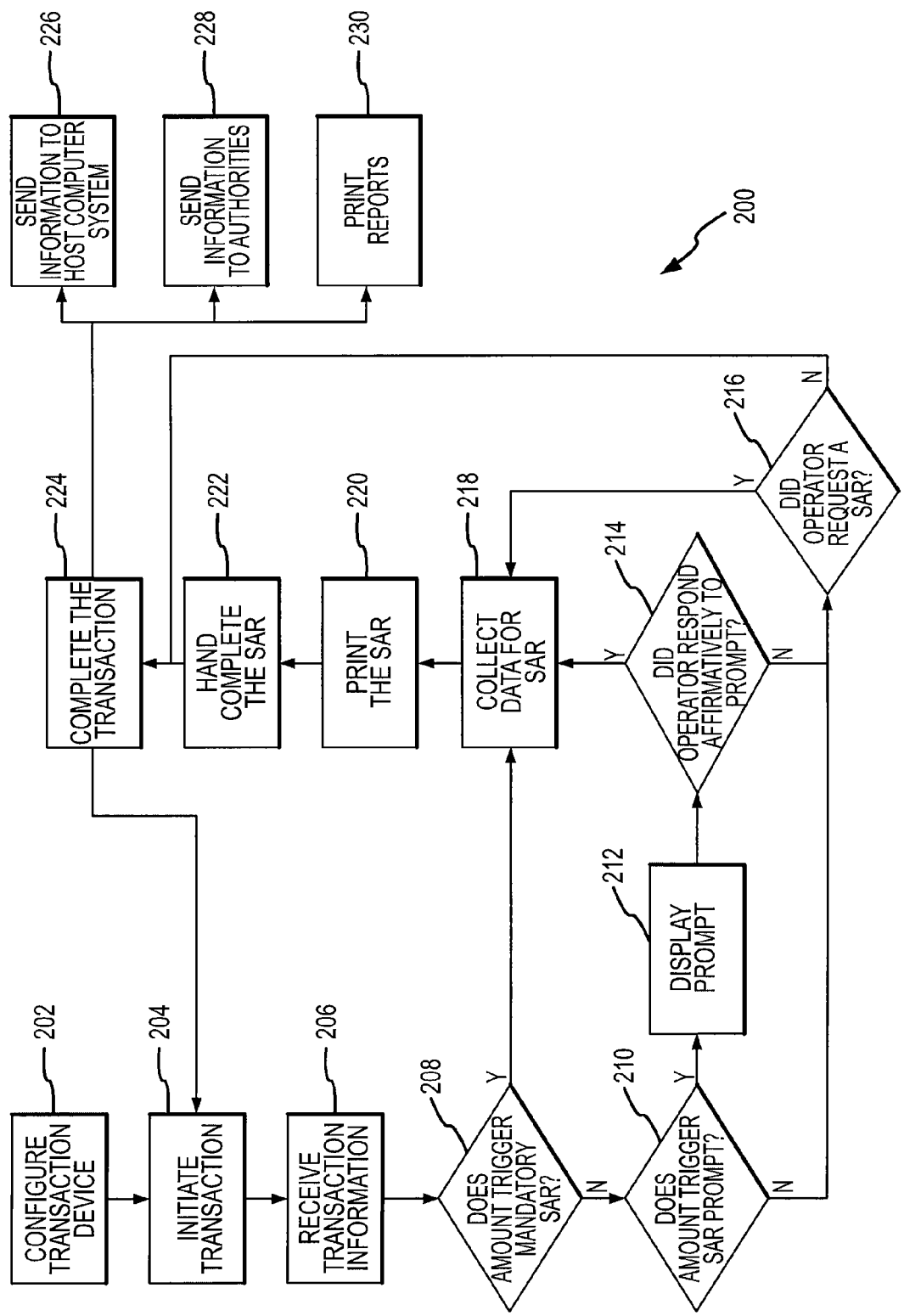
FIG. 2 illustrates a method of producing suspicious activity reports relating to financial transactions according to embodiments of the present invention.

Having described a system according to the present invention, attention is directed to FIG. 2, which illustrates a method 200 for producing suspicious activity reports according to embodiments of the present invention. The method 200 begins at block 202 wherein a transaction device is configured for producing SARs. According to the present invention, a transaction device is configured for producing SARs by programming the device to prompt for or automatically generate SARs. In some embodiments, transaction devices also may be configured to produce SARs in response to a request from an operator (i.e., on-demand SARs). The device also may be configured to produce a series of questions to which the operator responds by interviewing the customer and interactively entering the information into the transaction device. Other examples are possible.

Block 202 also may include configuring the transaction device by setting thresholds for producing SARs. For example, the device may be enabled for producing on-demand reports. If so, then a button on the device or a command entered by way of an input device initiates a SAR. If the not, then the transaction device may produce SARs only if other thresholds are triggered. One threshold may be a mandatory SAR threshold. If the mandatory threshold is triggered, then the transaction device initiates a SAR automatically. The mandatory SAR threshold may be a dollar amount; however, it also may be based on other transaction information such as a location of the sender or the receiver. Other examples are possible. In this specific example of an embodiment of the present invention, the mandatory SAR threshold is a dollar amount. The transaction device also may be configured for prompting for a SAR. A SAR prompt threshold may be established as a dollar amount or may be based on other transaction information. Again, in this example the SAR prompt is a dollar amount. If the SAR prompt threshold is triggered, then the transaction device may display a question for the operator such as "Produce SAR?" As will be described, if the operator elects to produce a SAR, then the device interactively collects information from the operator. If the operator elects not to produce a SAR, then the transaction process continues.

Block 202 also may include configuring the transaction device to produce SARs based on activity during certain times of day, days of the week, and the like. Configuring the device also may include programming it to look for multiple transactions by the same person, especially if those transactions exceed the previously-described thresholds.

Configuring the transaction device at operation 202 also may include selecting items that will be included in reports. For example, it may be of interest to collect information relating to transactions for which an operator was prompted to produce a SAR but elected not to do so. It may also be the case that configuring the transaction device includes determining whether to send electronic reports to security and/or law enforcement authorities and/or a host computer system. Other examples are possible.

Once the transaction device is configured, operators may initiate transactions for customers at block 204. Initiating a transaction may include entering a user ID and/or password, swiping an ID card, providing biometric information, and the like. In other examples, initiating a transaction includes merely powering up the transaction device. In still other examples, initiating a transaction includes entering a code that corresponds to the type of financial transaction (e.g., money order purchase, wire transfer, traveler's check purchase, etc.) the customer desires. Other examples are possible.

At operation 206, the transaction device receives transaction information. This may be any transaction information necessary for determining whether a SAR is required, suggested, or desired. The information may be received in response to a prompt presented to the operator by the transaction device. The prompt may be an audible prompt, a visual prompt, or the like. The information may be entered by the operator using any of a number of well known input devices. For example, the operator may use a keypad, a keyboard, a pointing device, and/or the like.

At block 208, the transaction device determines whether the transaction information triggers a mandatory SAR. In this example, if the dollar amount of the transaction exceeds the mandatory SAR trigger, then the device determines that a SAR is required, and the process continues at block 218, as will be described. If the mandatory SAR threshold is not triggered, then the process continues at block 210. The transaction device also may determine that a SAR is necessary because the customer has performed other recent transactions and the combine total of the transactions exceeds a threshold.

At block 210, the transaction device determines whether the SAR prompt threshold is triggered. Again, in this example, the SAR prompt threshold is a dollar amount. If the transaction amount is greater than the SAR prompt threshold, then the transaction device displays the prompt at block 212. The operator responds at block 214. If the operator responds affirmatively, then the process continues at operation 218, as will be described. If the operator responds in the negative or the SAR prompt threshold was not triggered at operation 210, then the process continues at block 216.

At block 216, the transaction device determines whether the operator has requested an on-demand SAR. If so, the process continues at block 218; if not, the process continues at block 224. In some examples, the transaction device may be configured to receive a request to generate at SAR at any point in the process, not just after blocks 210 and 216, as shown. Thus, it should be understood that the method 200 is exemplary, and other examples are possible.

At block 218, the transaction device initiates collection of information for a SAR. This process may include displaying questions to which the operator responds by asking the customer the question and entering the customer's answer into the transaction device using an input device. Collecting data also may include obtaining the data from the transaction information received at block 206. It may also be the case that collecting transaction data includes reading the date and/or time from an internal clock. Other examples are possible.

Collecting data for the SAR at block 218 may be limited to receiving numerical data by way of a keypad if the transaction device has only a keypad. Thus, in some examples, completing a SAR by hand may be necessary, as will be described.

At block 220, the transaction device prints the SAR. The printer may be integral with the transaction device, such as a receipt printer or money order printer, as is known. In some examples, the printer is a peripheral of the transaction device.

Other examples are possible. One example of a SAR is shown in FIG. 3, and will be explained in more detail below.

At block 222, the operator completes the SAR by hand as necessary. For example, if the operator is only able to enter numerical information into the transaction device, then if may be necessary for the operator to enter alphanumerical information, such as the sender's name and address, by hand.

At block 224, the operator completes the transaction. It may be the case, as is shown in this example of the present invention, that the transaction device will not allow completion of the transaction until the operator completes the SAR is one is required. This, however, is not a requirement. Completing the transaction may include printing a money order, completing a wire transfer by completing a receipt, printing travelers checks, and/or the like.

At block 226, the transaction device transmits SAR information to a host computer system. Although desirable in some circumstances, this operation is not necessary and is not required. Transmission of SARs to a host computer system may be enable by the configuration process at block 202.

At block 228, the SAR information is transmitted to authorities. The transaction device may be configured to transmit SAR information to authorities electronically. Alternatively, printed SARs may be mailed or delivered. In some embodiments, if SARs are sent to authorities electronically, they may be collected at a central location, such as the host computer system, and sent to authorities as a batch. In other embodiments, the information is sent following each transaction for which a SAR is generated.

At block 230, reports are printed. Reports may be printed automatically on a periodic schedule and/or on demand. Reports may include such things as a summary of all SARs produced during a period of time, information about transactions for which an operator declined to produce a SAR in response to a prompt, and the like. The content and scheduling of reports may be determined at block 202 by appropriately configuring the transaction device.

Having described a method of producing a SAR, attention is directed to FIG. 3, which illustrates one example of a SAR 300 according to embodiments of the present invention. Other examples are possible that may include different information. The SAR may be printed by the transaction processing device or a peripheral associated with it. In some cases, however, the process of generating SARs and sending the information to authorities is accomplished electronically. Thus, the SAR 300 may represent information that is included in an electronic file, not printed.

The SAR 300 includes a transaction information section 302 that includes the date and time of the transaction, an identification number representing the operator, and a number that represents the location of the transaction. This information may be pre-populated in the SAR by the transaction device.

The SAR 302 also includes a customer information section 304. The customer information may be entered by the operator from information received from the customer. In some examples, the information may come from an identification card of the customer that is swiped through the transaction processing device or otherwise interfaced with it. Many other examples are possible. The customer information section 304 includes, for example, the customer's name and address, including his country of residence.

The SAR 300 also includes a ID section 306 that includes information about the type of identification provided by the customer to the operator for ID verification. It may include the type if ID, the number of the ID, and the entity that issued the ID. In some examples, the ID section 306 includes the customer's social security or tax ID number.

The SAR 300 also may include a comments section 308 into which the operator may enter comments about the customer of the transaction. This section may be of particular importance in the case that the operator elects to produce a SAR for a transaction that otherwise may not have generated one.

The information for the SAR 300 may be entered using an input device or may be handwritten on a printed SAR. If the information is entered electronically, menus selection buttons, and the like may be used on selection screens to simplify the process. As previously mentioned, information also may be read by swiping cards through readers associated with the transaction device.

Other embodiments of the present invention are possible. For example, the determination of whether to produce a SAR may be made at any of several network levels and may be based on different criteria at each level. A provider at the top network level may desire to produce SARs based on one set of criteria, while an associate at the lowest network level may desire to produce SARs based on different criteria. The criteria may be established by each entity individually, and the SARs may be compiled and produced either independently or collectively. The criteria may be based on the transaction amounts, the customers on both the sending and receiving ends of the transaction, the time of day of the transactions, the frequency of the transactions, the location of either the receiving location or the sending location or the two combined, a cumulative transaction amount for a particular customer, even if distributed throughout the network, and the like or any combination of the foregoing. Similarly, reports of any kind may be compiled at any level of the network.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Additionally, those skilled in the art will realize that the present invention is not limited to financial transactions. For example, the present invention may be used to produce Suspicious Activity Reports in Connection with other activities such as postal transactions, travel purchases, customs inspections, and the like. Accordingly, the above description should not be taken as limiting the scope of the invention, which is defined in the following claims.

What is claimed is:

1. A computer-implemented method of producing a suspicious activity report, comprising:
   storing, by a computerized financial transaction system, configuration information wherein the configuration information configures the system to produce suspicious activity reports based on certain criteria, and wherein the certain criteria comprises both a mandatory SAR threshold and a SAR prompt threshold;
   receiving by the computerized financial transaction system, transaction information comprising an amount of a transaction;
   determining by the computerized financial transaction system, based on the transaction information and the certain criteria, whether a suspicious activity report is to be prepared, wherein determining whether the suspicious activity report is to be prepared comprises:

comparing by the computerized financial transaction system, the amount of the transaction to the mandatory SAR threshold; and comparing by the computerized financial transaction system, the amount of the transaction to the SAR prompt threshold and, if triggered by the comparison, displaying a prompt that asks an operator if he wants to prepare a suspicious activity report; and generating by the computerized financial transaction system, a suspicious activity report containing at least some of the transaction information.

2. The method of claim 1, further comprising transmitting the suspicious activity report to authorities.

3. The method of claim 2, wherein transmitting the suspicious activity report to authorities comprises:

collecting suspicious activity reports at a host computer system; and transmitting the collected suspicious activity reports to a computer system of the authorities.

4. The method of claim 1, further comprising receiving additional information and including the additional information in the suspicious activity report.

5. The method of claim 1, wherein determining whether a suspicious activity report is to be prepared comprises determining whether an operator has elected to produce an on-demand SAR.

6. The method of claim 1, further comprising printing a report relating to suspicious activity reports produced at a transaction processing device during a period of time.

7. The method of claim 1, wherein a transaction processing device is configured to print money orders.

8. A computer-implemented method of producing a suspicious activity report, comprising:

storing, by a computerized financial transaction system, configuration information at wherein the configuration information configures the system to produce suspicious activity reports based on certain criteria and wherein the certain criteria comprises both a mandatory SAR threshold and a SAR prompt threshold;

receiving, by the computerized financial transaction system, transaction information, wherein the transaction information comprises an amount of a transaction;

determining, by the computerized financial transaction system, based on the transaction information and the certain criteria, whether a suspicious activity report is to be prepared, wherein determining whether the suspicious activity report is to be prepared comprises:

comparing, by the computerized financial transaction system, the amount of the transaction to the mandatory SAR threshold;

comparing, by the computerized financial transaction system, the amount of the transaction to the SAR prompt threshold; and generating, by the computerized financial transaction system, a suspicious activity report containing at least some of the transaction information, wherein generating a suspicious activity report comprises:

printing, by the computerized financial transaction system, a suspicious activity report having a portion of the additional information and also having blanks for receiving additional suspicious activity report information.

9. A computerized transaction processing device, comprising:

an input device arranged to receive transaction information and SAR information;

a display screen arranged to display information to an operator; and application software that programs the transaction device to:

store configuration information, wherein the configuration information configures the device to produce suspicious activity reports based on certain criteria, wherein the certain criteria comprises both a SAR prompt threshold and a mandatory SAR threshold;

receive transaction information, wherein the transaction information comprises an amount of a transaction;

determine based on the transaction information and the certain criteria, whether a suspicious activity report is to be prepared, wherein determining whether the suspicious activity report is to be prepared comprises:

comparing the amount of the transaction to the mandatory SAR threshold; and comparing the amount of the transaction to the SAR prompt threshold; and generate a suspicious activity report containing at least some of the transaction information.

10. The transaction processing device of claim 9, wherein the application software also programs the transaction device to compare an amount of a transaction to the mandatory SAR threshold.

11. The transaction processing device of claim 9, wherein the application software also programs the transaction device to compare an amount of a transaction to the SAR prompt threshold.

12. The transaction processing device of claim 11, wherein the application software further programs the transaction device to:

display a prompt that asks an operator if he wants to prepare a suspicious activity report; and receive a response to the prompt.

13. The transaction processing device of claim 9, wherein the application software also programs the transaction device to determine whether an operator has elected to produce an on-demand SAR.

14. The transaction processing device of claim 9, wherein the application software further programs the transaction device to print a report relating to SARs produced at the transaction processing device during a period of time.

15. The transaction processing device of claim 9, wherein the transaction processing device is configured to print money orders.

* * * * *